Feb. 21, 1967     K. C. FORD     3,305,117
DOUBLE HAND TRUCK ASSEMBLY
Filed Jan. 25, 1965     2 Sheets-Sheet 1
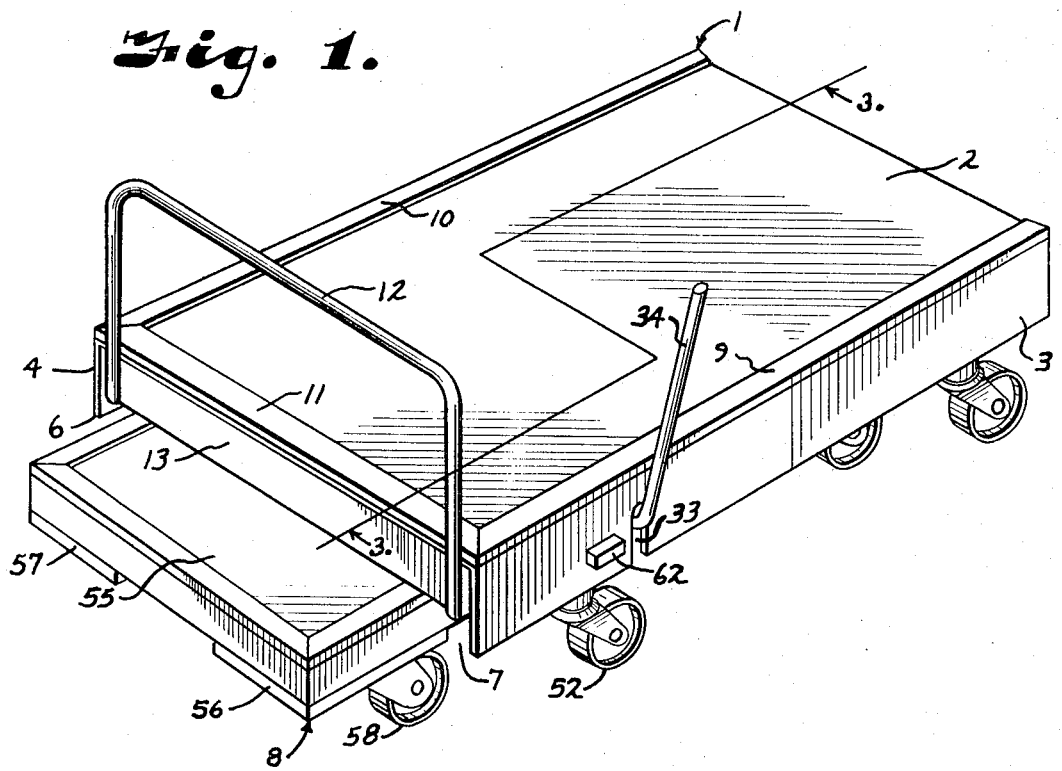
INVENTOR.
KENNETH C. FORD
BY
*Fishburn and Gold*
ATTORNEYS Feb. 21, 1967  K. C. FORD  3,305,117
DOUBLE HAND TRUCK ASSEMBLY
Filed Jan. 25, 1965  2 Sheets-Sheet 2
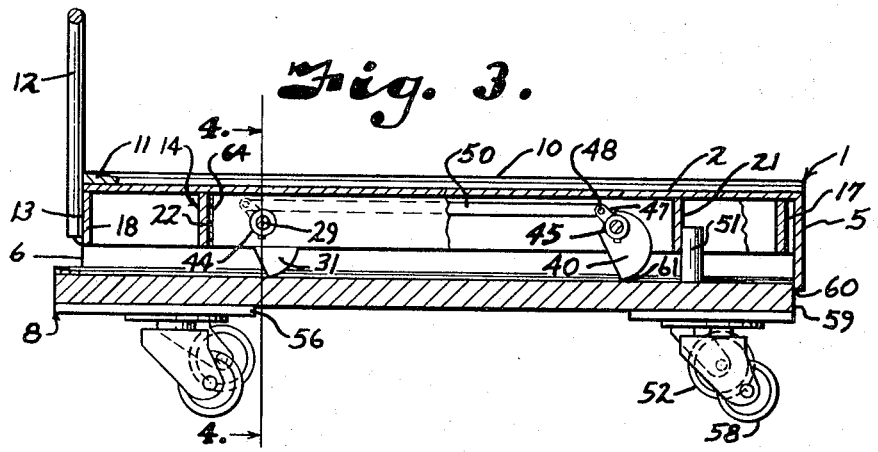
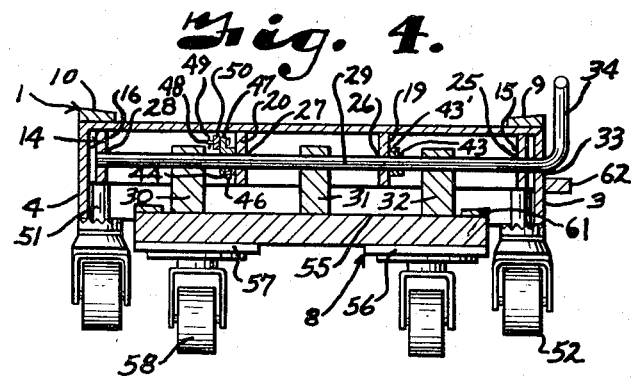
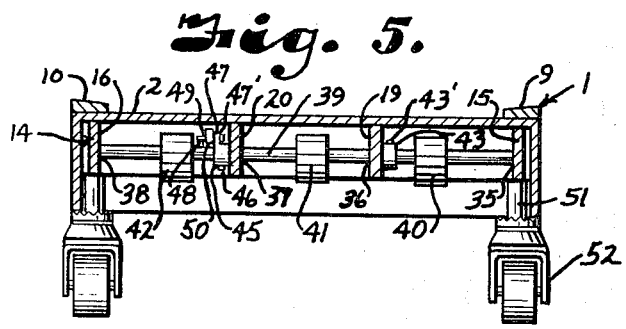
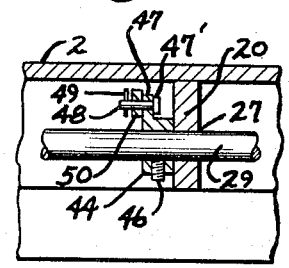
INVENTOR.
KENNETH C. FORD
BY
Fishburn & Gold
ATTORNEYS United States Patent Office
3,305,117
Patented Feb. 21, 1967

3,305,117
DOUBLE HAND TRUCK ASSEMBLY
Kenneth C. Ford, 6101 W. 87th Terrace,
Overland Park, Kans. 66207
Filed Jan. 25, 1965, Ser. No. 427,839
9 Claims. (Cl. 214—515)

This invention relates to hand trucks and more particularly to a pair of hand trucks, one of which has mechanism for riding "piggyback" on the bed of the other truck.

Platform-type hand trucks are essential for movement of various goods or products around warehouses, stores, and other places of business where the goods are piled on the trucks and moved from one place to another for unloading. An example is where a truck delivers a load of merchandise to an unloading platform of a place of business and the goods are placed upon the truck for movement into the store for a place of unloading to be displayed in such store. The storing of these trucks is a problem because of the space required.

The principal object of the present invention is to provide a main truck and an auxiliary truck of slightly less width than the main truck wherein the auxiliary truck may be rolled under the main truck between the wheels thereof, and the main truck has mechanism for engaging the bed of the auxiliary truck to raise the wheels of the main truck from the floor whereby both trucks may be moved from place to place together, and more particularly to conserve space on a loading dock or storage place by having the two trucks nested or "piggyback".

It is well known that a considerable number of these trucks are necessary around loading docks, warehouses and the like, and the cost of providing space when the trucks are not in use where they are stored side by each is a matter of primary concern. The present main truck may be of a size substantially the same as those now in use, and the frame on the present invention adapted for use in such old form of trucks.

Other objects of the present invention are to provide the main truck with a framework structure, having longitudinally extending and transverse cross members underneath the bed thereof, the longitudinal sides of the frame providing a support for caster wheels; to provide transverse openings in the longitudinal members aligned with each other for receiving spaced shaft extending transversely of the framework; to provide said shaft with spaced cam members; to provide one of said shafts with a portion extending outwardly of the side of the truck and turned transversely to provide a lever for the shaft; to provide a link member having pivotal connections with means on the shafts whereby movement of the lever will rotate both of such shafts to rotate the cam members to engage the bed of the auxiliary truck to raise the wheels of the main truck from the floor; to provide a second or auxiliary truck of less width than the bed of the main truck whereby it will roll under the bed of the main truck and remain co-extensive with the bed of said ruck; to provide said second truck with dolly-type wheels or rollers and to provide a pair of trucks wherein, by rotation of the lever on the main truck, the cams on the shafts of the main truck will contact the top of the bed of the second truck and raise the rollers of the main truck from the surface of the floor so that it will ride "piggyback" on the second truck, and the trucks may be moved as one.

A still further object of the present invention is to provide a pair of trucks of this character, wherein they are in "piggyback" relation and conserve storage space.

Other objects and advantages of this invention will become apparent from the following description taken in connection with the accompanying drawings wherein are set forth by way of illustration and example certain embodiments of this invention.

FIG. 1 is a perspective view of the main truck with the auxiliary truck partly under the main truck.

FIG. 2 is a longitudinal cross-sectional view showing the second truck partly under the first truck and all of the wheels on the surface of the floor.

FIG. 3 is a longitudinal cross-sectional view, particularly illustrating the cams on the shafts engaging the top of the second truck and the wheels of the first truck raised from the floor taken on the line 3—3, FIG. 1.

FIG. 4 is a cross-sectional view taken on a line 4—4, FIG. 3.

FIG. 5 is a cross-sectional view taken on a line 5—5, FIG. 2.

FIG. 6 is an enlarged cross-sectional view of the collar and arm connection of the link connecting the shafts of the cam raising mechanism.

Referring more in detail to the drawings:

1 designates a main truck embodying the features of my invention comprising a bed 2, sides 3 and 4 depending therefrom, and a rear end 5. The front end 6 is open as indicated at 7 for access of the auxiliary truck 8 as will later be described. The top or bed 2 has side strips 9 and 10 and a forward end member 11, tapered inwardly from the outside of the truck as shown in FIGS. 4 and 5 to retain articles of goods thereon when stored upon the truck.

The truck includes a U-shaped handle bar 12 rigidly secured to the front end 13 of a framework structure 14 mounted underneath the bed 2 comprising longitudinal side members 15 and 16 and end members 17 and 18. Rigidly secured to the end members in longitudinal spaced relation are longitudinal struts 19 and 20. Cross members 21 and 22 are provided and spaced from the ends 17 and 18. Spaced cross struts 23 and 24 are provided between the longitudinal members 19 and 20 to provide a more rigid framework.

The side members 15 and 16 and longitudinal members 19 and 20 are provided with openings 25, 26, 27 and 28 in transverse alignment for receiving a shaft 29, upon which are mounted spaced cam members 30, 31 and 32. One end of the shaft extends through an opening or slot 33 in the side wall 3 and is turned transversely to form a lever 34. The side members and longitudinal members 21, 22, 23, 24 respectively are provided forwardly of the transverse member 21 with transversely aligned openings 35, 36, 37 and 38 for receiving a shaft 39 on which are mounted spaced cam members 40, 41 and 42. The shafts 29 and 39 are provided with collars 43 adjacent to the longitudinal member 19 to hold the shafts in place, the collars being held on the shafts by set screws 43' as indicated in FIG. 4.

Mounted on the shafts 29 and 39 adjacent to the longitudinal member 20 are collars 44 and 45, held in place by set screws or the like 46. The collars have arms 47 extending from one side thereof and are provided with openings 47' for receiving pins 48 having heads 48' and being held in the openings by a cotter key or the like 49. Pivotally mounted on the pins 48 is a link 50, whereby rotation of the lever 34 will rotate the shafts 29 and 39 and thereby rotate the cam members for a purpose later described.

Mounted on the side members 15 and 16 of the framework structure, spaced from the ends thereof, are shanks 51 for caster wheels 52, there being two wheels at the front and two at the back of the truck and the rear wheels on each truck may be rigid if desired instead of rotating as is the usual dolly-type wheel.

The truck 8 has a bed 55 of a width lesser than the space between the caster wheels 52 of the truck 1, as illustrated in FIG. 4. The bed includes corner frames 56 and 57 at the front and rear ends of the truck 8, and mounted at the four corners thereof are caster wheels 58, there being two at the front and two at the back, and the ones at the back may also be rigidly mounted as stated in connection with truck 1.

It is obvious that the trucks 1 and 8 may be used separately and loads placed thereon when desired for movement of goods or packages from a mobile truck to the loading dock of a place of business. While I have not shown a handle bar or other implement for guiding the auxiliary truck 8, a handle bar similar to bar 12 on the main truck may be utilized for the auxiliary truck 8, or a rope (not shown) may be used as is the usual practice. The bed 55 may be provided with side strips, if desired, as shown the same as the main truck as shown at 10, 11, and 12.

When it is desired to transport the trucks 1 and 8 empty, the truck 1 may be rolled over the truck 8 from the rear 59 of the truck 8 and the rear end 59 will engage against the lower portion 60 of the end 5 of truck 1. Both trucks may be pulled then by handle bar for movement of the same.

For ease in transporting the trucks 1 and 8 together when in "piggyback" relation, after the truck 1 is moved over the truck 8 from left to right as shown in the drawings, movement of the lever forwardly from right to left in FIG. 1 will cause the cam members 30, 31 and 32 to rotate with the shaft 29 and by connection of the link 50, the shaft 39 will be rotated, thereby rotating the cams 40, 41 and 42 to contact the top surface 61 of the bed 55 of truck 8 as shown in FIG. 3, thereby raising the wheels 52 of the truck 1 from the floor surface for easy transportation of both trucks. A stop lug 62 is provided on the side 3 forwardly of the slot 33 to limit downward movement of the handle 34 to control the movement of the cams so as not to go over center. In order to hold the cams in this engaged position as shown in FIG. 2, I provide a pad 63 on the side of the transverse member 23 and a pad 64 on the side of the transverse member 22 so that when the lever is moved to a vertical position as shown in FIG. 1, the edges of the cams will engage such pads as indicated at 65 and 66 (FIG. 2) and retain the same by friction in unengaged position. The forward portion of the link 50 extending over the shaft 39 will also tend to limit the rotation of the cams to also hold the shafts and cams in unengaged position when not in "piggyback" relation with the truck 8.

It will be obvious from the foregoing that I have provided an improved "piggyback" construction for trucks wherein one truck is nested under the other and by cam means the wheels of the top truck may be disengaged from the floor surface for easy transportation of the same and for storage.

The invention also contemplates that when the trucks are used in a warehouse for loading of goods thereon and then placed in large trailer transport trucks to transport to another place, the trucks after being unloaded may then be returned to the trailer trucks and placed in "piggyback" relation to conserve space in the trailers for return of the trucks to their place of use.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In combination, a main platform truck having a bed, depending sides, and a rear end and an open front,
   (a) a frame secured under the bed of said truck having spaced longitudinal members and a front and rear end,
   (b) a handle bar on the front end of said frame,
   (c) transversely aligned bearing openings in said longitudinal members spaced from the front and rear ends of the frame,
   (d) shafts in said bearing openings, one of said shafts extending outwardly of one of the sides of the bed and turned transversely to form a lever,
   (e) spaced cam members on said shafts,
   (f) caster wheels mounted in said frame near the respective corners of the frame,
   (g) a second platform truck having a bed of a width to pass between said caster wheels of the first truck,
   (h) caster wheels on the second truck, and
   (i) means connecting the said shafts whereby rotation of said lever will cause said cams to engage the bed of the second truck to raise the first truck with respect to the second and the caster wheels of the first truck from the floor for transportation of said two trucks.

2. In combination, a platform truck having a bed, depending sides, and a rear end and an open front,
   (a) a frame secured under the bed of said truck having spaced longitudinal members and a front and rear end,
   (b) a handle bar on the front end of said frame,
   (c) transversely aligned bearing openings in said longitudinal members spaced from the front and rear ends of the frame,
   (d) shafts in said bearing openings, one of said shafts extending outwardly of one of the sides of the bed and turned transversely to form a lever,
   (e) spaced cam members on said shafts,
   (f) wheels mounted in said frame near the respective corners of the frame,
   (g) a second platform truck having a bed of a width to pass between said caster wheels of the first truck,
   (h) wheels on the second truck, and
   (i) link means connecting the said shafts whereby rotation of said lever will cause said cams to engage the bed of the second truck to raise the first truck with respect to the second and the caster wheels of the first truck from the floor for transportation of said two trucks.

3. In combination, a main platform truck having a bed, depending sides, and a rear end and an open front,
   (a) a frame secured under the bed of said truck having spaced longitudinal members and a front and rear end,
   (b) a handle bar on the front end of said frame,
   (c) transversely aligned bearing openings in said longitudinal members spaced from the front and rear ends of the frame,
   (d) shafts in said bearing openings, one of said shafts extending outwardly of one of the sides of the bed and turned transversely to form a lever,
   (e) spaced cam members on said shafts,
   (f) wheels mounted in said frame near the respective corners of the frame,
   (g) a second platform truck having a bed of a width to pass between said caster wheels of the first truck,
   (h) wheels on the second truck, and
   (i) collars having arm portions on said shafts adjacent one of the longitudinal members, and means connecting the said arms whereby rotation of said lever will cause said cams to engage the bed of the second truck to raise the first truck with respect to the second and the caster wheels of the first truck from the floor for transportation of said two trucks or for storage.

4. The combination of claim 3 wherein said means connecting said arms is an elongated link member.

5. In combination, a main platform truck having a bed, depending sides, and a rear end and an open front,
   (a) a frame secured under the bed of said truck having spaced longitudinal members and a front and rear end,
   (b) a handle bar on the front end of said frame,
   (c) transversely aligned bearing openings in said longitudinal members spaced from the front and rear ends of the frame, (d) shafts in said bearing openings, one of said shafts extending outwardly of one of the sides of the bed and turned transversely to form a lever, (e) spaced cam members on said shafts, (f) caster wheels mounted in said frame near the front end and rear wheels mounted near the rear end, (g) a second platform truck having a bed of a width to pass between said caster wheels of the first truck, (h) caster wheels on the second truck, and (i) means connecting the said shafts whereby rotation of said lever will cause said cams to engage the bed of the second truck to raise the first truck with respect to the second and the caster wheels of the first truck from the floor for transportation of said two trucks.

6. The combination of claim 1 wherein the rear end of the main truck is lower than the bed of the second truck so that the rear end of the second truck will engage thereagainst to transport the same.

7. In combination, a main platform hand truck having a bed, depending sides, a rear end and an open front, the sides of said bed being parallel to each other, (a) a frame having side members secured under the bed of the main truck, (b) wheels carried by said side members near the respective front and rear ends thereof, said wheels being spaced transversely of each other, (c) a second platform hand truck having a bed with front and rear ends and side edges, (d) and wheels on said bed of the second truck near the front and rear ends, said second truck supported on said last named wheels being of a height to pass under the open front of the main truck supported on said first named wheels and underneath the bed of the main truck and of a width to pass between the wheels of the main truck, the side edges of the second truck being parallel, the rear end of the main truck being lower than the bed of the second truck whereby the rear end of the second truck will engage against the end of the main truck for transportation of the two trucks and in storage, (e) and means carried by said frame engaging with the bed of the second truck to raise the main truck from the floor.

8. The combination of claim 7 wherein said means for raising said main truck includes spaced transverse shafts carried by said frame, cams on said shafts engaging the bed of the second truck, means connecting said shafts and means for rotating said shafts to raise the main truck with respect to second truck.

9. The combination of claim 8 wherein the means connecting said shafts are collars having arms and a link member pivotally connected to said arms and the last named means is a lever connected to one of said shafts for actuating said cams.

References Cited by the Examiner

UNITED STATES PATENTS

| | | | |
|---|---|---|---|
| 1,535,203 | 4/1925 | Cook | 214—38 X |
| 2,048,580 | 7/1936 | Webber | 214—38 |
| 3,027,174 | 3/1962 | Garbarino | 280—33.99 |
| 3,197,224 | 7/1965 | Kappen | 280—33.99 X |

FOREIGN PATENTS 700,486  12/1953  Great Britain.

GERALD M. FORLENZA, *Primary Examiner.*

ALBERT J. MAKAY, *Examiner.*